United States Patent
Bergantino et al.

(10) Patent No.: US 6,791,983 B1
(45) Date of Patent: Sep. 14, 2004

(54) CONTENT-ADDRESSABLE MEMORY FOR USE WITH A COMMUNICATION PACKET PROCESSOR TO RETRIEVE CONTEXT INFORMATION

(75) Inventors: Paul V. Bergantino, Lexington, MA (US); Anna K. Kujtkowski, Foxboro, MA (US); Jeffrey M. Winston, Sudbury, MA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 791 days.

(21) Appl. No.: 09/802,159

(22) Filed: Mar. 8, 2001

Related U.S. Application Data
(60) Provisional application No. 60/211,863, filed on Jun. 14, 2000.

(51) Int. Cl.[7] .............................................. H04L 12/56
(52) U.S. Cl. ....................................... 370/392; 711/108
(58) Field of Search .......................... 370/351–53, 389, 370/390–3, 412, 419, 428–9, 471, 473, 474, 475–6; 711/108–9, 112, 115, 200, 202, 211, 214, 216–18

(56) References Cited

U.S. PATENT DOCUMENTS

| | | | |
|---|---|---|---|
| 5,329,618 A | | 7/1994 | Moati et al. |
| 5,926,626 A | * | 7/1999 | Takeuchi et al. ............ 709/249 |
| 6,304,903 B1 | * | 10/2001 | Ward ........................ 709/224 |
| 6,502,163 B1 | * | 12/2002 | Ramankutty ................ 711/108 |
| 6,535,951 B1 | * | 3/2003 | Ross ........................ 711/108 |
| 2001/0043614 A1 | * | 11/2001 | Viswanadham et al. .... 370/469 |
| 2003/0123448 A1 | * | 7/2003 | Chang ..................... 370/395.1 |
| 2004/0039845 A1 | * | 2/2004 | Feldmeier et al. .......... 709/245 |

FOREIGN PATENT DOCUMENTS

WO    WO 99/14893    3/1999

* cited by examiner

Primary Examiner—David Vincent
(74) Attorney, Agent, or Firm—Keith Kind (57) ABSTRACT

A content-addressable memory is comprised of processing logic and selector logic. The processing logic receives a first selector including packet header information from the packet processing circuitry. The processing logic transfers the first selector to the selector logic. The processing logic generates additional selectors and transfers the additional selectors to the selector logic. The selector logic receives and processes selectors for matches and provides results corresponding to the matches. The processing logic receives the results from the selector logic and transfers at least some of the results that point to packet processing context structures to the packet processing circuitry.

20 Claims, 7 Drawing Sheets

CONTENT-ADDRESSABLE MEMORY FOR USE WITH A COMMUNICATION PACKET PROCESSOR TO RETRIEVE CONTEXT INFORMATION

RELATED CASES

This application claims the benefit of U.S. Provisional application 60/211,863 filed Jun. 14, 2000, and which is hereby incorporated by reference into this application.

BACKGROUND OF THE INVENTION

1. Field of the Invention

The invention is related to the field of packet communications, and in particular, to packet processing circuitry.

2. Statement of the Problem

A communication packet is a unit of information that is transferred from one point to another over a communication system. The packet includes a header that indicates to the communication system how the packet should be processed. The primary task when processing a packet is properly routing the packet from the sender to the receiver, although there are many other tasks, such as security, service classification, billing, and address translation. Two common examples of packet communication protocols are the Internet Protocol (IP) and the Asynchronous Transfer Mode (ATM) protocol.

Communication packet processors are integrated circuits that receive, process, and transmit packets. With an insatiable demand for high-speed communications, packet processors are being driven to handle more packets at higher speeds. Compounding the problem is the desire that packet processors offer a more robust set of packet handling options.

To accomplish this difficult task, a packet processor includes a high-speed core processor that executes a packet processing software application. Under software control, the core processor processes the header of an incoming packet to retrieve context information from a memory for the packet. The context information specifies how the packet should be handled with respect to routing, security, and other areas. Under software control, the core processor then processes the context information to control packet handling.

To retrieve the desired context information, the core processor must associate the packet header with the memory locations that hold the desired context information. The core processor must then retrieve the desired context information from the associated memory locations. If the core processor modifies the context information, it must then write the modified context information back to the correct memory locations. This process is repeated for each packet, so the core processor is repeatedly associating headers with memory locations, retrieving context information, and writing modified context information to the memory locations.

This task is further complicated by the increase in processing options that can be applied to a packet. As the processing options increase, so does the size of the context information that specifies these options. The core processor must now handle increasingly larger amounts of context information, or the core processor must selectively retrieve only the desired data contained in the context information.

With increasing speeds and processing requirements, the core processor is becoming over-tasked. The result is either a loss of speed or processing options. One solution is simply to add higher-speed processors. Unfortunately, this solution adds too much cost to the underlying system.

A Content-Addressable Memory (CAM) is an integrated circuit that can search a list at high speed to provide a corresponding result. The CAM is configured with a list of selector entries. Each selector entry has a corresponding result. When the CAM receives an input selector, it searches the list of selector entries for a match. The search is accomplished at high speed by concurrently comparing each selector entry to the input selector. Unfortunately, CAMs have not been effectively applied to help solve the above problem.

SUMMARY OF THE SOLUTION

The invention helps solve the above problems with a CAM that helps relieve the core processor of the complexity of retrieving selected context information. In response to a selector from packet processing circuitry, the CAM provides results that point to desired context information in memory. Advantageously, the CAM can generate additional selectors from the initial selector, so there is a reduction in use of the data bus that carries selectors to the CAM. The data bus can then be used to transfer results to the packet processing circuitry. If desired, the results bus and its associated pins can be eliminated. The CAM can operate at high speeds, and core processor capacity is freed up for other processing tasks. In addition, the context information can be managed as a single data base of context structures that is shared by the packets.

In some examples of the invention, the CAM is comprised of processing logic and selector logic. The processing logic receives a first selector including packet header information from the packet processing circuitry. The processing logic transfers the first selector to the selector logic. The processing logic generates additional selectors and transfers the additional selectors to the selector logic. The selector logic receives and processes selectors for matches and provides results corresponding to the matches. The processing logic receives the results from the selector logic and transfers at least some of the results that point to packet processing context structures to the packet processing circuitry. The CAM may even not include pins for a results bus.

The processing logic may receive the first one of the selectors over a bi-directional data bus and transfer the results over the bi-directional data bus. The processing logic may generate the additional selectors by incrementing a portion of the first selector. The processing logic may receive a search series from the packet processing circuitry and generate the additional selectors based on the search series. The processing logic may generate the additional selectors based on a search series indicated by a first result corresponding to the first selectors. The first result corresponding to the first selector may indicate an instruction for the packet processing circuitry. The first result corresponding to the first selector may indicate a trigger. The context structures may relate to network address translation, billing, packet forwarding, packet security, and packet classification. The CAM may be configured with the packet processing circuitry on a single integrated circuit.

DESCRIPTION OF THE DRAWINGS

The same reference number represents the same element on all drawings.

DETAILED DESCRIPTION OF THE INVENTION

Figure 1:
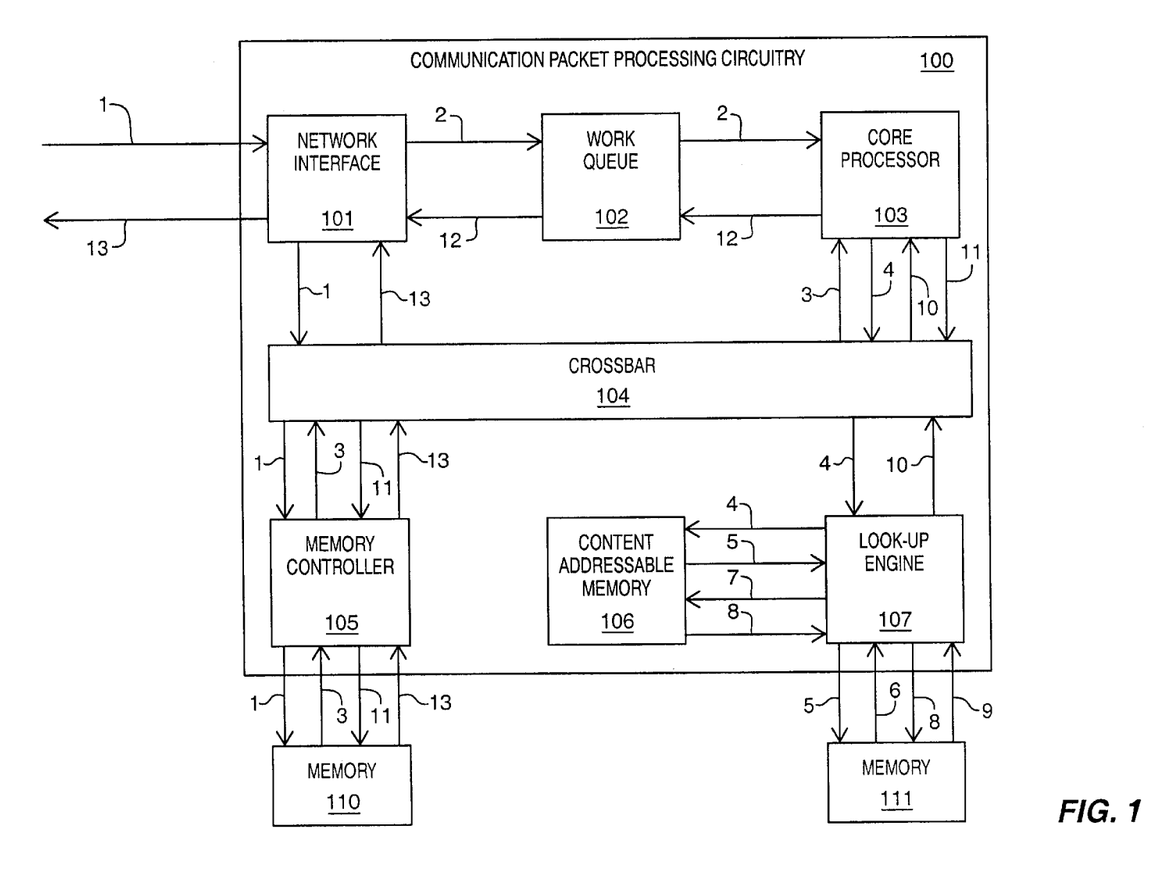
FIG. 1 illustrates communication packet processing circuitry in an example of the invention.

Communication Packet Processing Circuitry—FIG. 1

FIG. 1 illustrates communication packet processing circuitry 100 in an example of the invention. Circuitry 100 is coupled to memory 110 and memory 111. Memory 110 stores packets. Memory 111 stores context structures that control how the packets are handled by circuitry 100.

Circuitry 100 receives communication packets and stores them in memory 110. Circuitry 100 processes the headers in the packets to obtain a summation block of the context structures from memory 111. Examples of context structures are context information related to network address translation, billing, packet forwarding, packet security, and packet classification. Circuitry 100 processes the packets based on the context structures and transfers the processed packets from memory 110.

Circuitry 100 is comprised of network interface 101, work queue 102, core processor 103, crossbar 104, memory controller 105, Content-Addressable Memory (CAM) 106, and look-up engine 107. Based on this disclosure, those skilled in art will readily appreciate how to modify conventional packet processing circuitry to make and use circuitry 100. Circuitry 100 could be a single integrated circuit or an inter-operating set of discreet circuits. For example, CAM 106 could be in a stand-along integrated circuit. Memories 110 and 111 could be integrated together or integrated within circuitry 100. Memory 110 could be a Synchronous Dynamic Random Access Memory (SDRAM). Memory 111 could be a Static Random Access Memory (SRAM).

Network interface 101 exchanges packets with off-chip systems. Network interface 101 exchanges the packets with memory controller 105 and exchanges processing entries with work queue 102. Work queue 102 buffers entries for subsequent processing. Core processor 103 processes incoming packets in response to work queue 102 entries from network interface 101. Network interface 101 transfers processed packets to external systems in response to work queue 102 entries from core processor 103. Crossbar 104 exchanges signals between various the elements of circuitry 100. Memory controller 105 exchanges packets between network interface 101 and memory 110. Memory controller 105 exchanges packet headers between core processor 103 and memory 110.

Core processor 103 could be a conventional microprocessor core that executes packet processing software to direct packet handling. Core processor 103 retrieves a packet header from memory 110 through memory controller 105 in response to an entry in work queue 102. Core processor 103 obtains a summation block of context structures for the packet from memory 111 through look-up engine 107. Core processor 103 executes software to process the packet header and the context structures to apply selected processing to the packet. Core processor 103 transfers the processed header back to memory 110 through memory controller 105 and places a packet transfer entry in work queue 102.

Look-up engine receives a selector that includes packet header information from core processor 103. The selector also indicates the types of context structures for the packet that are desired by core processor 103—these types are typically defined by core processor software. CAM 106 and look-up engine 107 operate together to select the relevant context structures from memory 111. Look-up engine 107 builds a summation block of these selected context structures and provides the summation block to core processor 103. CAM 106 and look-up engine 107 are discussed in detail below.

FIG. 1 depicts signals 1–13 that are also described in the following table.

| SIGNAL | FROM | TO | CONTENT |
| --- | --- | --- | --- |
| 1 | OFF-CHIP | MEMORY 110 | PACKET |
| 2 | NET IF 101 | PROCESSOR 103 | QUEUE ENTRY |
| 3 | MEMORY 110 | PROCESSOR 103 | HEADER |
| 4 | PROCESSOR 103 | CAM 106 | FIRST SELECTOR |
| 5 | CAM 106 | MEMORY 111 | FIRST RESULT |
| 6 | MEMORY 111 | LOOK-UP 107 | FIRST CONTEXT |
| 7 | LOOK-UP 107 | CAM 106 | SECOND SELECTOR |
| 8 | CAM 106 | MEMORY 111 | SECOND RESULT |
| 9 | MEMORY 111 | LOOK-UP 107 | SECOND CONTEXT |
| 10 | LOOK-UP 107 | PROCESSOR 103 | SUMMATION BLOCK |
| 11 | PROCESSOR 103 | MEMORY 110 | HEADER |
| 12 | PROCESSOR 103 | NET IF 101 | QUEUE ENTRY |
| 13 | MEMORY 110 | OFF-CHIP | PACKET |

In operation, network interface 101 receives a packet from off-chip and transfers the packet through crossbar 104 and memory controller 105 to memory 110. Network interface 101 also places an entry for the packet in work queue 102. Core processor 103 reads the queue entry and retrieves the packet header from memory 110 through memory controller 105 and crossbar 104.

Core processor 103 processes the packet header to generate a first selector. Core processor transfers the first selector through crossbar 104 to look-up engine 107. Look-up engine transfers the first selector to CAM 106. CAM 106 processes the first selector to determine if it matches any CAM entries. If a match is found, CAM 106 transfers a corresponding first result to look-up engine 107. Look-up engine 107 transfers the first result to memory 111 to retrieve a first context structure. Look-up engine 107 uses the first context structure to build the summation block for core processor 103.

In some examples, look-up engine 107 performs a series of searches in CAM 103 to obtain additional results and retrieve additional context structures from memory 111. For a search series, look-up engine 107 generates at least a second selector based on the first selector. Typically, this involves the modification of a portion of the first selector in response to modification instructions from core processor 103. Look-up engine 107 transfers the second selector to CAM 106.

CAM 106 processes the second selector to determine if it matches any CAM entries. If a match is found, CAM 106 transfers a corresponding second result to look-up engine 107. Look-up engine 107 transfers the second result to memory 111 to retrieve the second context structure. Look-up engine 107 uses the second context structure to further build the summation block for core processor 103. Additional selectors may similarly generated and used to further build the summation block. Thus, by properly configuring CAM 103 and memory 111, a single selector from core processor 103 can be used to build a summation block of context structures that are relevant to the packet.

Look-up engine 107 transfers the summation block to core processor 103 through crossbar 104. Core processor 103 processes the context structure in the summation block to determine how the packet should be handled. When packet handling is complete, core processor 103 transfers an entry to work queue 102 and transfers the header back to memory 110. Network interface 101 reads the queue entry and transfers the packet off-chip from memory 110.

Once a summation block is built, core processor 103 may instruct look-up engine 107 to install the summation block in memory 111 for later use. Installation avoids the task of repeatedly rebuilding the summation block. In response to a core processor install instruction, look-up engine 107 writes the selector for the installed summation block into CAM 106 and receives the corresponding CAM result. Look-up engine 107 then writes the summation block to memory 111 at an address that corresponds to the CAM result. Thus, core processor 103 may quickly reacquire the summation block without look-up engine 107 using multiple CAM searches to rebuild the summation block.

Figure 2:
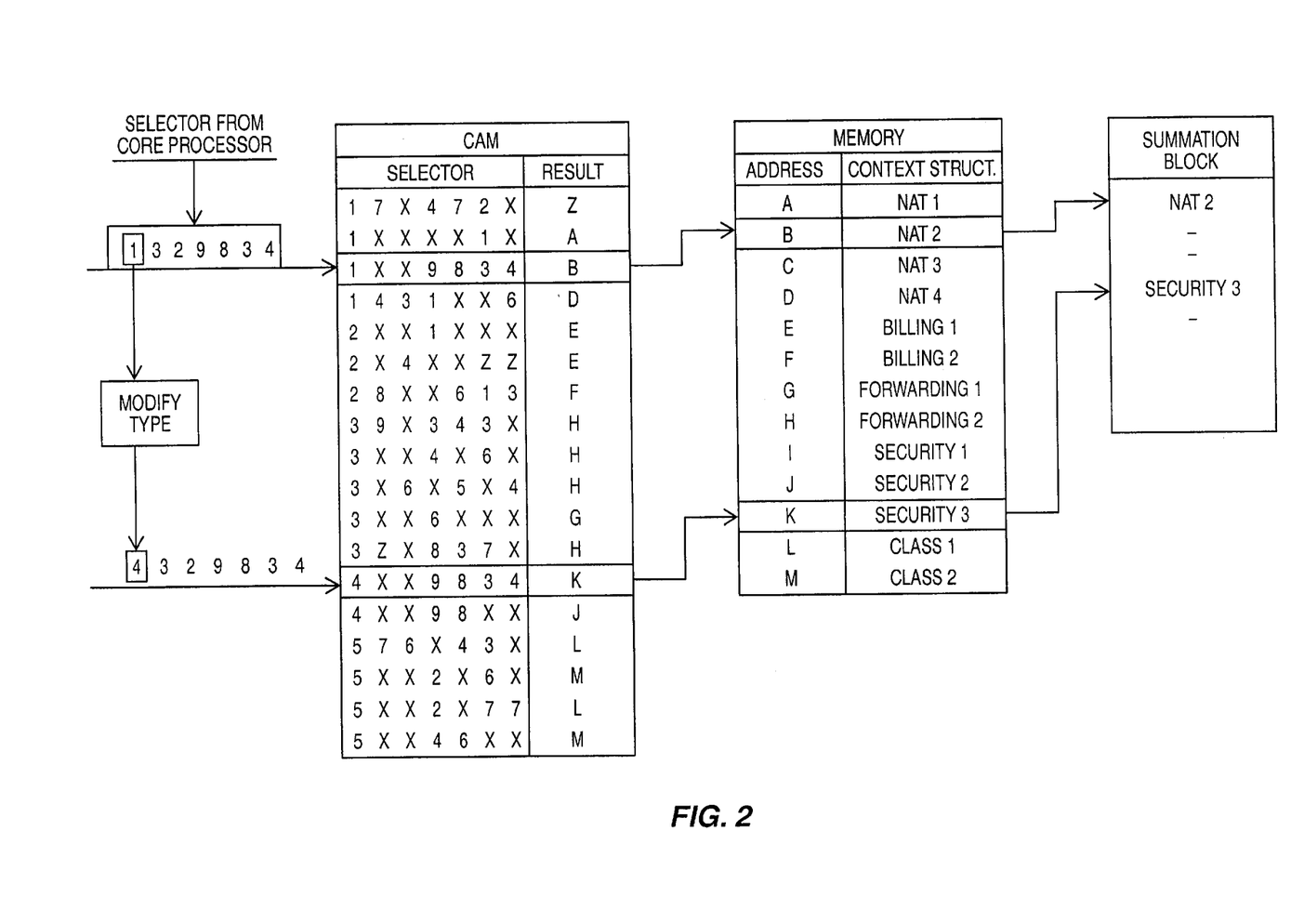
FIG. 2 illustrates the relationship between a selector and its summation block in an example of the invention.

The Selector and Summation Block—FIG. 2

FIG. 2 illustrates the relationship between a selector and its summation block—which effectively determines how packets with a particular header will be handled. One example of a selector is given below with a number of bits indicated in parentheses.

TYPE (8)-INTERFACE ID (16)-PROTOCOL (8)-SOURCE ADDRESS (32)-DESTINATION ADDRESS (32)-SOURCE PORT (16)-DESTINATION PORT (16)

The type at the front of the selector can be associated with a specific type of context structure. The following table lists an example of these associations.

| TYPE | CONTEXT STRUCTURE |
|---|---|
| 1 | NETWORK ADDRESS TRANSLATION |
| 2 | BILLING |
| 3 | PACKET FORWARDING |
| 4 | PACKET SECURITY |
| 5 | PACKET CLASSIFICATION |

FIG. 2 shows a CAM configured with various selectors and corresponding results. For simplicity, each portion of the above-example of a selector is represented on FIG. 2 by a single digit. The CAM is ternary, so an X is a don't care that matches everything. The CAM results point to context structures in the memory. In effect, the CAM results select the context structures that are applied to a given packet.

To illustrate an example, consider that there are four different network address translation context structures (NAT 1–4) and three different security context structures (SECURITY 1–3). Also consider that it is desired to implement NAT 2 and SECURITY 3 for packets with the following: source address=9, destination address=8, source port=3, and destination port=4. The interface ID and the protocol of these packets does not matter, so the relevant packets will have a selector ending with the digits 9834.

Before the packets arrive, the CAM is configured with selector entries 1XX9834 and 4XX9834 to trigger the appropriate matches. The CAM is also configured with corresponding results B and K that point to the desired context structures NAT 2 and SECURITY 3. When a packet arrives with a header indicating interface ID=3, protocol=2, source address=9, destination address=8, source port=3, and destination port=4, then the core processor generates the type 1 selector 1329834. This first selector matches the entry 1XX9834 in the CAM, and the corresponding result B points to the NAT 2 context structure in the memory. Based on result B, the NAT 2 context structure is placed in the summation block for the packet.

The second selector is generated by modifying the type field from 1 to 4. Typically, the core processor indicates which types need searched and in what order by specifying a search series. The second selector 4329834 matches the entry 4XX9834 in the CAM and the corresponding result K points to the SECURITY 3 context structure in the memory. The SECURITY 3 context structure is then placed in the summation block. The core processor then handles the packet based on the summation block with the desired context structures.

Note that the CAM entry under 4XX9834 is 4XX98XX, which also matches the selector 4329834. This lower entry has a corresponding result J that points to the SECURITY 1 context structure. Since, the CAM only returns a result for the lowest matching address, result J is not returned. This allows for prioritization of context structures by their relative placement in the CAM. In this example, the packet received SECURITY 3, whereas all other packets with the same source/destination address but with different ports would receive SECURITY 1.

The summation block has fields that are assigned to types. The context structures are the same size and configuration as the summation block, but the context structures only have valid fields for their particular type. Thus, a summation block may be built by simply overlaying the selected context structures.

Figure 3:
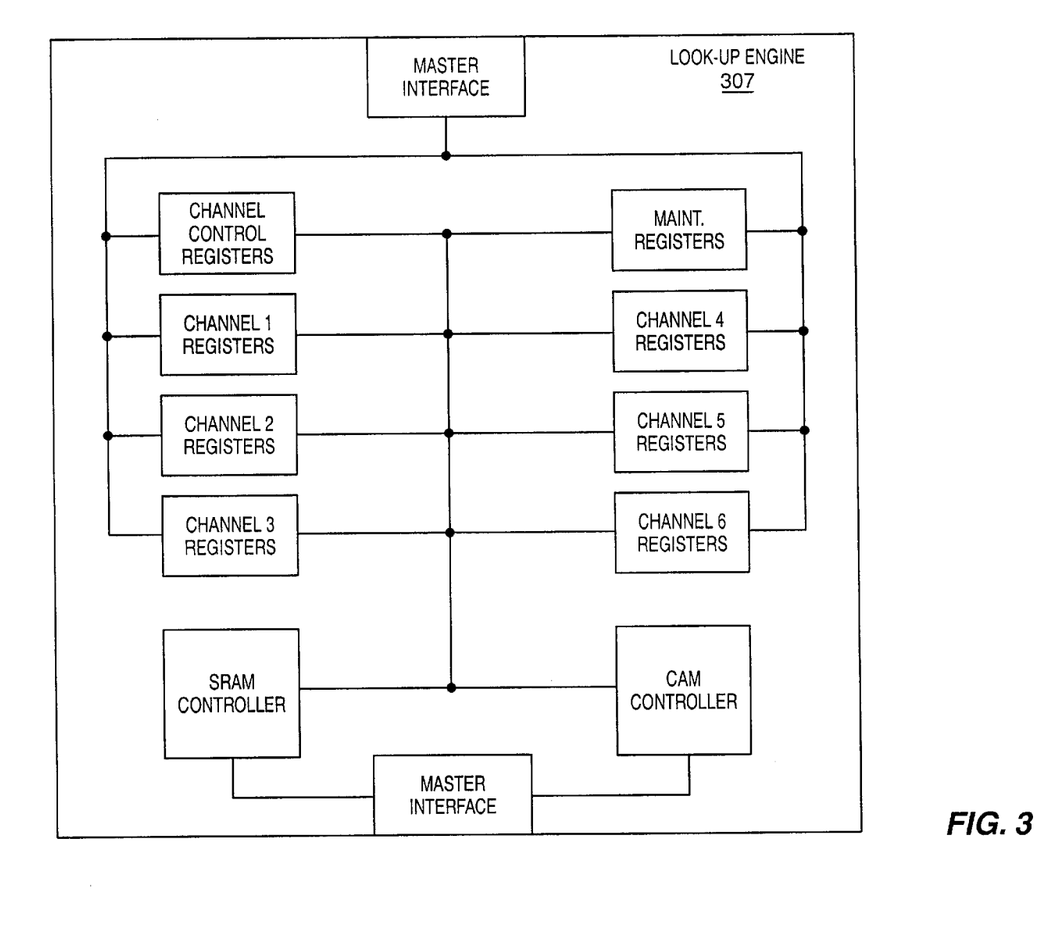
FIG. 3 illustrates a look-up engine in an example of the invention.
Figure 4:
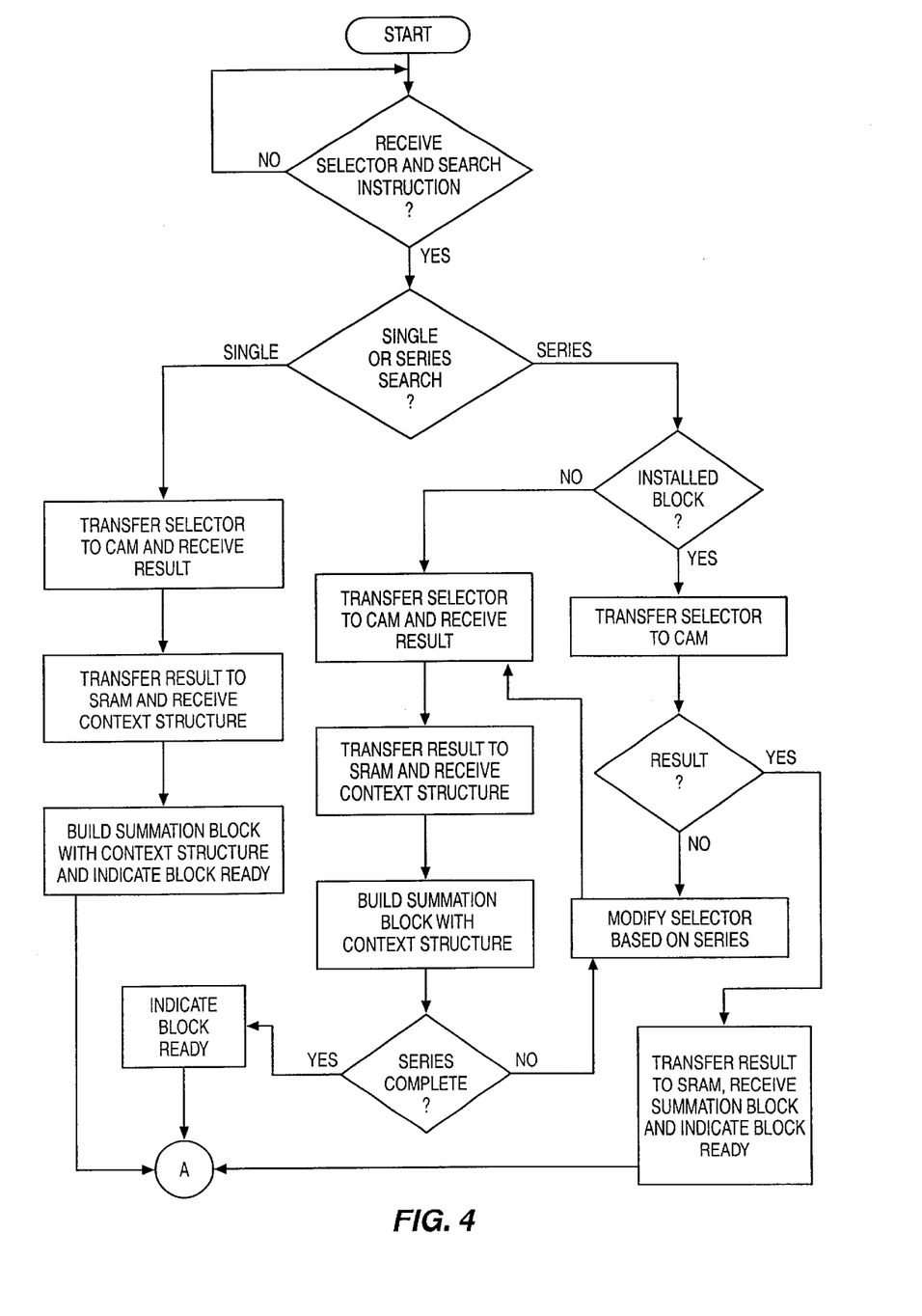
FIG. 4 illustrates operations for a look-up engine.
Figure 5:
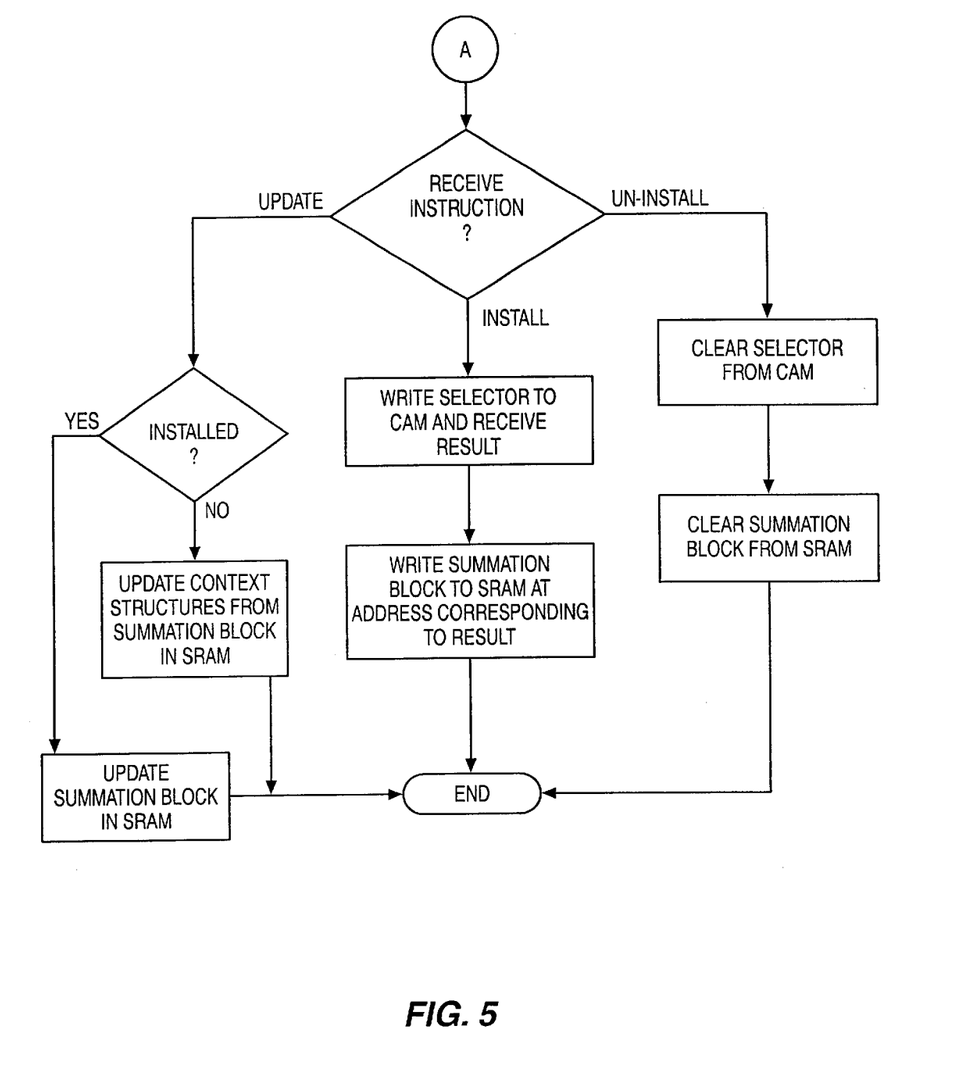
FIG. 5 illustrates operations for a look-up engine.

Look-Up Engine—FIGS. 3–5

FIG. 3 illustrates look-up engine 307 in an example of the invention. Look-up engine 307 is comprised of master interface, memory interface, SRAM controller, CAM controller, channel control registers, registers for channels 1–6, and maintenance registers. The core processor is one example of a master that uses look-up engine 307, but other systems may also act as a master. The master interface is used to communicate with the core processor and other masters, typically through the crossbar. The memory interface is used to communicate with the CAM and with an SRAM that stores context structures and installed summation blocks.

The core processor and other masters use the channels to obtain summation blocks. Look-up engine 307 serves the channels in a round robin order. Each channel has registers for a selector and associated summation block. Each channel has additional registers to define three different search series and to specify selector-related operations. The core processor is given four of the channels, and two channels are reserved for other masters. The other masters can obtain a channel by reading an available channel number from the channel control registers. When finished, the masters return the channel by writing the channel number to the channel control registers. The core processor may also release some of its channels for use by the other masters in a similar fashion.

FIGS. 4–5 illustrate operations for look-up engine 307. To obtain a summation block for a packet, the master writes the corresponding selector and a search instruction to its channel registers. A bit in the type field of the selector indicates if a single search or a series search is desired, and if a search series is indicated, the master also writes the types for the series search in the desired search order to its channel registers. A field indicates which of the three search series to use. Another field indicates if the search is for an installed summation block.

If a single search is requested, then the CAM controller transfers the single selector to the CAM and transfers any CAM result to the SRAM controller. The SRAM controller retrieves the context structure that corresponds to the CAM result from the SRAM. The SRAM controller builds the summation block with the context structure and writes the summation block to the channel registers. The SRAM controller indicates in the channel registers that the summation block is ready for the master.

If a series search is requested that is not for an installed summation block, then the CAM controller transfers the first selector to the CAM and transfers any CAM result to the SRAM controller. The CAM controller then modifies the selector as indicated by the search series and performs additional CAM searches in order. CAM results are forwarded to the SRAM controller. The SRAM controller retrieves the context structures that correspond to the CAM results from the SRAM. The SRAM controller builds the summation block with these context structures and writes the summation block to the channel registers. The SRAM controller indicates in the channel registers that the summation block is ready for the master.

If a series search is requested for an installed summation block, then the CAM controller transfers the first selector for the summation block to the CAM. If a result is returned, then the CAM result is forwarded to the SRAM controller. The SRAM controller retrieves the summation block that corresponds to the CAM result from the SRAM. The SRAM controller writes the summation block to the channel registers. The SRAM controller indicates in the channel registers that the summation block is ready for the master. If the CAM result for the first selector is not returned, then the CAM controller modifies the selector as indicated by the search series and performs additional CAM searches. The CAM results are forwarded to the SRAM controller. The SRAM controller retrieves the context structures that correspond to the CAM results from the SRAM. The SRAM controller builds the summation block with these context structures and writes the summation block to the channel registers. The SRAM controller indicates in the channel registers that the summation block is ready for the master.

Moving to FIG. 5, to update the summation block in SRAM, the master modifies summation block in its channel registers and writes an update instruction to its channel registers. For an installed summation block, the SRAM controller updates the summation block in the SRAM. For an uninstalled summation block, the SRAM controller updates the corresponding context structures in the SRAM.

To install the summation block in SRAM, the master writes an install instruction to its channel registers. The CAM controller then writes the selector associated with the summation block into a free CAM entry. Selectors for installed summation blocks have a type of zero. The CAM controller receives the result corresponding to the new selector entry and transfers the result to the SRAM controller. The SRAM controller writes the summation block to the SRAM memory location associated with the result. The look-up engine tracks the age of each installed summation block and periodically removes installed summation blocks that have aged beyond an aging threshold.

To un-install the summation block in SRAM, the master writes an un-install instruction to its channel registers. The CAM controller then clears the selector for the installed summation block from the CAM. The CAM controller receives the CAM result corresponding to the cleared selector entry and transfers the result to the SRAM controller. The SRAM controller clears the installed summation block from the SRAM memory location associated with the result.

Figure 6:
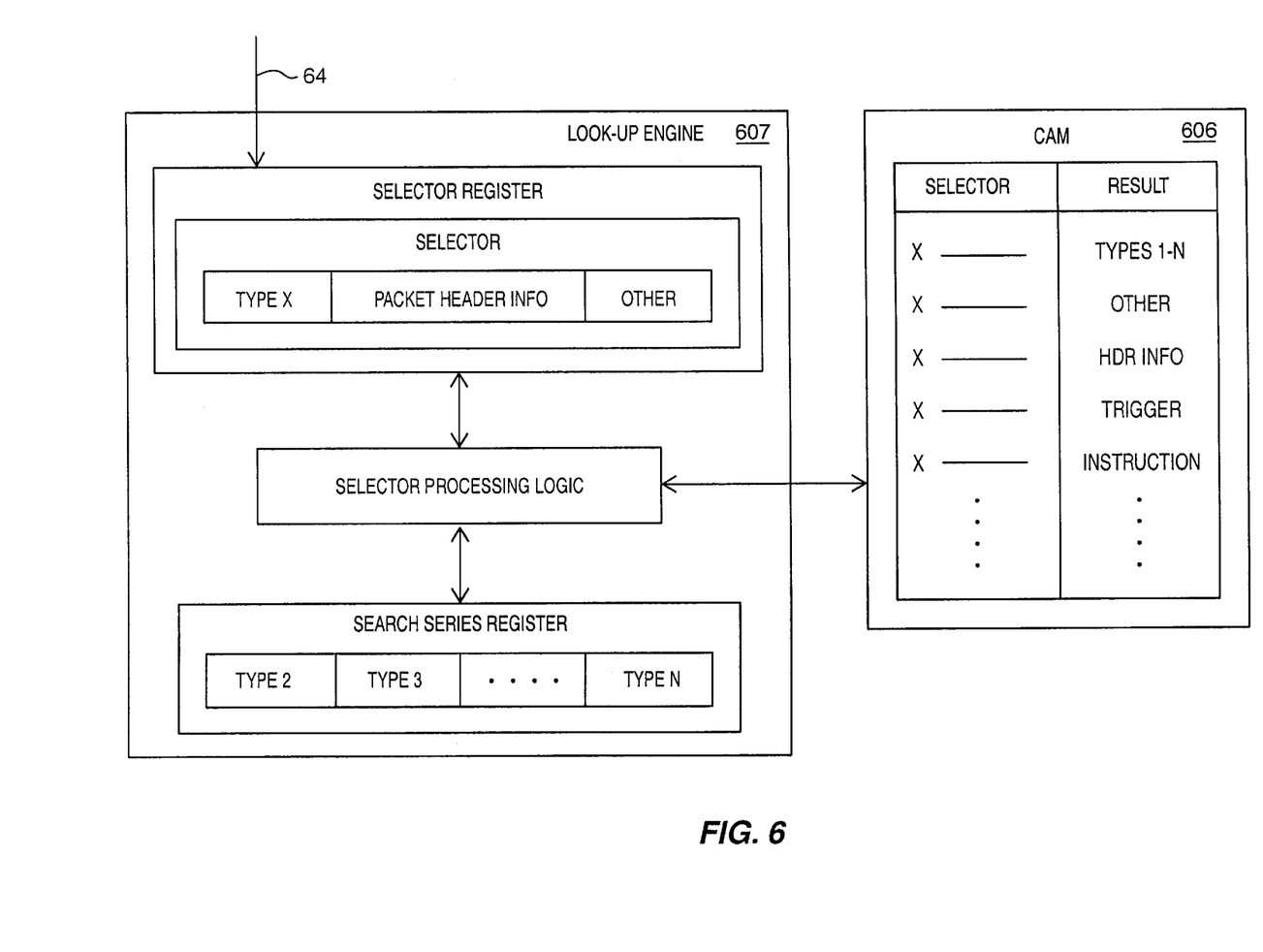
FIG. 6 illustrates a CAM and a look-up engine in an example of the invention.

Look-Up Engine and CAM Selector Processing—FIG. 6

FIG. 6 illustrates CAM 606 and look-up engine 607 in an example of the invention. In this example, look-up engine 607 and CAM 606 inter-operate to process the selector from the master to provide more robust packet processing. Look-up engine 607 may modify the selector, generate a search series, and determine triggers or instructions for subsequent processing. Those skilled in the art will recognize how these options may be combined.

CAM 606 is configured with selectors and corresponding results. Look-up engine 607 is configured with a selector register, search series register, and selector processing logic. Aside from modifications described with respect to FIG. 6, CAM 606 and look-up engine 607 are configured and operate as described above.

Look-up engine 607 receives selector 64 from the master. Selector 64 has a special type, referred to here as type X. Type X may directly indicate the desired selector processing—for example determine a search series. Type X may represent a set of special types where specific special type indicates different selector processing—for example type X1 indicates determine a search series and type X2 indicates modify the selector. Type X may also refer to the CAM result to indicate the desired selector processing.

To modify the selector, the selector processing logic transfers a selector with type X to CAM 606. CAM 606 matches the selector and provides the corresponding result to look-up engine 607. The result may indicate a new type, new header information, or other information that may be included in a selector. The selector processing logic modifies selector 64 based on the result.

To build a search series, the selector processing logic transfers a selector with type X to CAM 606. CAM 606 matches the selector and provides the corresponding result to look-up engine 607. The result indicates types 1-N. The selector processing logic modifies selector 64 based on the result to include type 1. The selector processing logic adds types 2-N to the search series register.

An instruction is an action that look-up engine 607 is configured to recognize and implement. A primary example of an instruction is summation block installation. A trigger is a condition that initiates additional processing when met. For example, if a subsequent CAM result has a certain code, then the particular processing option is applied, such as modifying the selector header information, building a search series, or obtaining an instruction.

To obtain a trigger or instruction, the selector processing logic transfers a selector with type X to CAM 606. CAM 606 matches the selector and provides the corresponding result to look-up engine 607. The result indicates the trigger or instruction. The selector processing logic implements the trigger or instruction when applicable. For example, the selector processing logic may generate an instruction to install a summation block automatically after the summation block is obtained.

Figure 7:
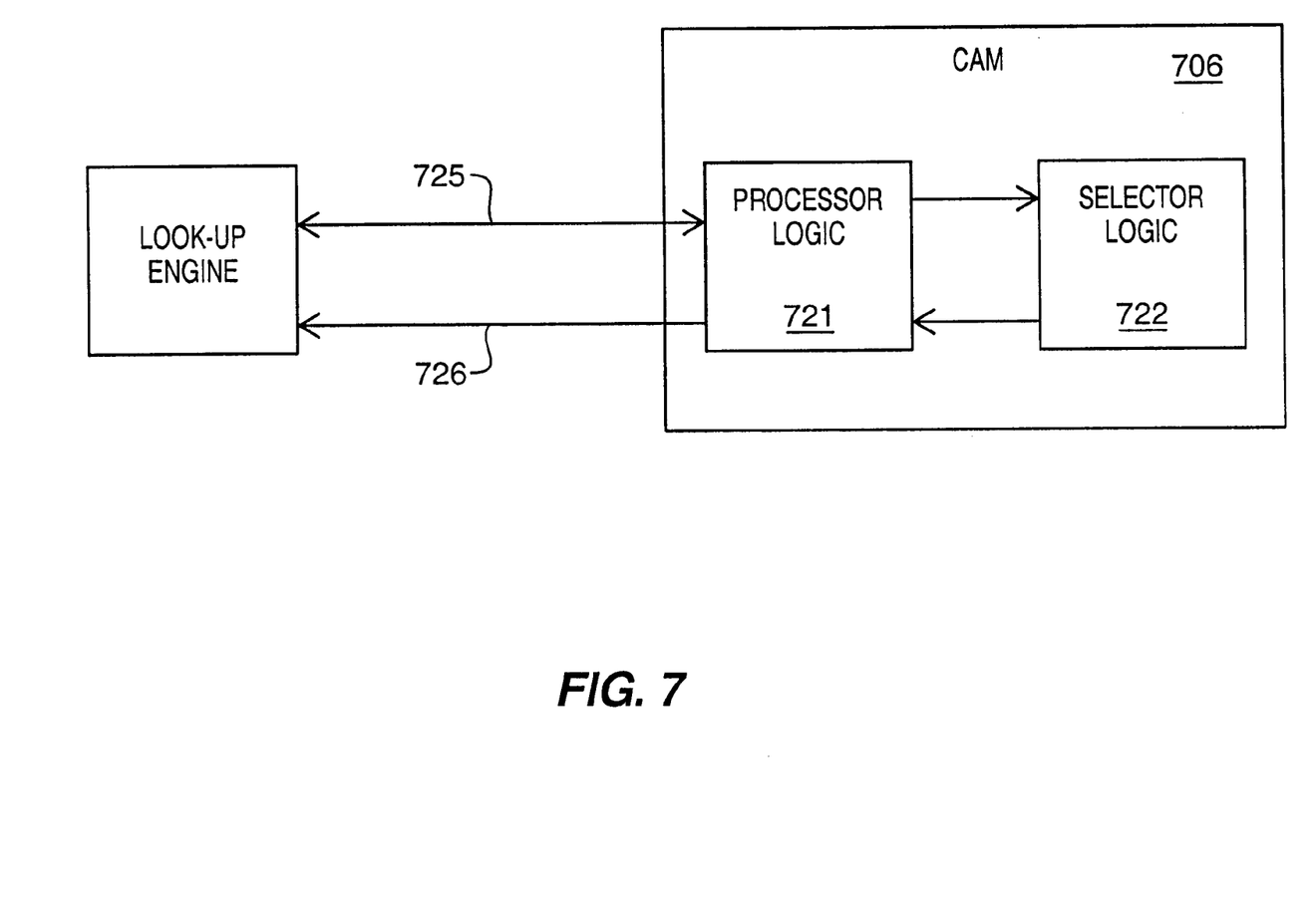
FIG. 7 illustrates a CAM in an example of the invention.

Special CAM Configuration—FIG. 7

FIG. 7 illustrates CAM 706 in an example of the invention. CAM 706 is comprised of processing logic 721 and selector logic 722. Processing logic 721 is coupled to the look-up engine by data bus 725 and results bus 726—although results bus 726 can be omitted in some cases. Processing logic 721 processes selectors and communicates between logic 722 and buses 725–726. Selector logic 722 is configured and operates as described above for a CAM to process selectors and provide corresponding results.

In one example, the look-up engine transfers a selector over data bus 725 to processing logic 721. Processing logic 721 submits the selector to selector logic 722 to obtain a corresponding result from selector logic 722. Processing logic 724 then automatically increments the type field in the selector and submits the modified selector to selector logic 722 to obtain a corresponding result from selector logic 722. This process repeats until the type field increments to a specified number.

In another example, the look-up engine transfers a selector and a search series over data bus 725 to processing logic 721. Processing logic 721 submits the selector to selector logic 722 to obtain a corresponding result from selector logic 722. Processing logic 721 then modifies the type field in the selector based on the search series and submits the modified selector to selector logic 722 to obtain a corresponding result from selector logic 722. This process repeats until the search series is completed.

Note that data bus 725 is no longer required to transfer selectors for every CAM search because processing logic 721 automatically modifies the selector and submits the modified selectors to selector logic 722. This generates extra capacity on data bus 725. If desired, processing logic 721 can transfer the corresponding results over data bus 725 to the look-up engine using this extra bus capacity. Advantageously, results bus 726 and its associated pins could be eliminated. Alternatively, results bus 726 could still be used to carry results to the look-up engine.

Processing logic 721 may incorporate the processing described above with respect to selector modification and search series generation. To modify the selector, processing logic 721 transfers a selector to selector logic 722 to obtain a corresponding result from selector logic 722. The result may indicate a new type, new header information, or other information that may be included in a selector. Processing logic 721 modifies the selector based on the result and resumes search operations.

To build a search series, processing logic 721 transfers a selector to selector logic 722 to obtain a corresponding result from selector logic 722. The result indicates types 1-N. Processing logic 721 submits a series of selectors with types 1-N to selector logic 722 to obtain corresponding results from selector logic 722 that are provided to the look-up engine.

Additional Look-Up Engine Features

A profiling series is a particular type of series search that can be defined in the channel registers. The profiling series obtains a summation block that contains counters instead of the usual context structures. The summation block of counters may be generated and installed as described above. The master may modify the counters in the summation block or use an auto-update mechanism in the look-up engine. In an example of an auto-update scenario, the summation block has eight pairs of counters—counter 1 and counter 2. The look-up engine holds auto-increment values for counter 1 and counter 2 in registers that are configurable by the masters. If the master asserts auto-update and the auto-increment values are in the registers, then the look-up engine automatically updates the summation block counters 1 and 2 by their respective auto-increment values for each profile series search. The typical example is to count packets having a given selector by auto-incrementing by one. The master may also write the number of bytes in the packet to the auto-increment register to profile a total number of bytes for a given selector.

Several context structures may share data at a common memory location. Each context structure identifies its fields that do not hold data but point to shared data. When building the summation block, the look-up engine uses pointers from these fields to retrieve the shared data from the common memory location. If the summation block is then installed for subsequent use, the shared data is written back to the shared memory locations and the appropriate pointers are placed in the stored summation block. When the stored summation block is re-used, the look-up engine uses the pointers to retrieve the shared data and place it in the summation block for the master. The look-up engine allows the master and other masters to initialize and maintain the SRAM and CAM. Since the entries in the CAM are directly associated with context structures and summation blocks in SRAM, it may be desirable to stop search activities while the CAM and SRAM are being modified. To initiate maintenance, the master reads status from the maintenance registers to determine if a maintenance operation is allowed. If so, the master writes to the maintenance registers to lock out maintenance operations by other masters. If desired, the master may also write to the maintenance registers to lock out search operations. Unless search operations are locked out, they get priority over maintenance operations.

The maintenance registers include separate registers for CAM maintenance operations and SRAM maintenance operations. For CAM maintenance operations, the master writes an address and transaction type to the CAM maintenance registers. For a write operation, the master also writes data and a data mask to the CAM maintenance registers. The data mask indicates don't care CAM entries. The CAM controller executes the maintenance operation and indicates operation completion in the CAM maintenance registers. In response to completion, the master typically unlocks maintenance and search operations for other masters.

For SRAM maintenance operations, the master writes an address and transaction type to the SRAM maintenance registers. For a write operation, the master also writes data to the SRAM maintenance registers. The SRAM controller executes the maintenance operation and indicates operation completion in the SRAM maintenance registers. In response to completion, the master typically unlocks maintenance and search operations for other masters.

The look-up engine supports several different CAMs. The look-up engine includes CAM configuration registers that receive configuration information for the CAM that is selected for implementation. The look-up engine inter-operates with the selected CAM by using the CAM configuration information in the registers. Some examples of the CAM configuration information includes: address granularity, strobe polarity, data width, number of cycles from selector to result, cycles for match flags, and addressing and compared parameters.

FIGS. 1–7 and the above description depict specific examples of packet processing circuitry in accord with the present invention. Those skilled in the art will appreciate that some conventional aspects of the circuitry have been simplified or omitted for clarity. Those skilled in the art will appreciate that the features described above could be combined in various ways to form multiple variations of the invention. Those skilled in the art will appreciate variations of the circuitry that fall within the scope of the invention. As a result, the invention is not limited to the specific examples described above, but only by the following claims and their equivalents.

What is claimed is:

1. A content-addressable memory for use with communication packet processing circuitry, the content-addressable memory comprising:

selector logic configured to receive and process selectors for matches and provide results corresponding to the matches; and processing logic configured to receive a first one of the selectors including packet header information from the packet processing circuitry, transfer the first one of the selectors to the selector logic, generate additional ones of the selectors, transfer the additional ones of the selectors to the selector logic, receive the results from the selector logic, and transfer at least some of the results that point to packet processing context structures to the packet processing circuitry.

2. The content-addressable memory of claim 1 wherein the processing logic is configured to receive the first one of the selectors and transfer the results over a bi-directional data bus.

3. The content-addressable memory of claim 2 wherein content-addressable memory does not include a pin for a results bus.

4. The content-addressable memory of claim 1 wherein the processing logic is configured to generate the additional ones of the selectors by incrementing a portion of the first one of the selectors.

5. The content-addressable memory of claim 1 wherein the processing logic is configured to receive a search series from the packet processing circuitry and generate the additional ones of the selectors based on the search series.

6. The content-addressable memory of claim 1 wherein the processing logic is configured to generate the additional ones of the selectors based on a search series indicated by a first one of the results corresponding to the first one of the selectors.

7. The content-addressable memory of claim 1 wherein a first one of the results corresponding to the first one of the selectors indicates an instruction for the packet processing circuitry.

8. The content-addressable memory of claim 1 wherein a first one of the results corresponding to the first one of the selectors indicates a trigger.

9. The content-addressable memory of claim 1 wherein the context structures relate to at least one of: network address translation, billing, packet forwarding, packet security, and packet classification.

10. The content-addressable memory of claim 1 wherein the content-addressable memory is configured with the packet processing circuitry on a single integrated circuit.

11. A method of operating a content-addressable memory for use with communication packet processing circuitry, the method comprising:

receiving a first one of a plurality of selectors from the packet processing circuitry, the first one of the selectors including packet header information;

generating additional ones of the selectors;

processing the selectors for matches and providing results corresponding to the matches; and transferring at least some of the results that point to packet processing context structures to the packet processing circuitry.

12. The method of claim 11 wherein receiving the first one of the selectors comprises receiving the first one of the selectors over a bi-directional data bus and wherein transferring the results comprises transferring the results over the bi-directional data bus.

13. The method of claim 12 wherein content-addressable memory does not include a pin for a results bus.

14. The method of claim 11 wherein generating the additional ones of the selectors comprises incrementing a portion of the first one of the selectors.

15. The method of claim 11 further comprising receiving a search series from the packet processing circuitry and wherein generating the additional ones of the selectors comprises generating the additional ones of the selectors based on the search series.

16. The method of claim 11 wherein generating the additional ones of the selectors comprises generating the additional ones of the selectors based on a search series indicated by a first one of the results corresponding to the first one of the selectors.

17. The method of claim 11 wherein a first one of the results corresponding to the first one of the selectors indicates an instruction for the packet processing circuitry.

18. The method of claim 11 wherein a first one of the results corresponding to the first one of the selectors indicates a trigger.

19. The method of claim 11 wherein the context structures relate to at least one of: network address translation, billing, packet forwarding, packet security, and packet classification.

20. The method of claim 11 wherein the content-addressable memory is configured with the packet processing circuitry on a single integrated circuit.

* * * * *